United States Patent
Heim et al.

(10) Patent No.: US 10,528,190 B2
(45) Date of Patent: *Jan. 7, 2020

(54) WATER ROBUSTNESS AND DETECTION ON CAPACITIVE BUTTONS

(71) Applicant: Microchip Technology Germany GmbH, Rosenheim (DE)

(72) Inventors: Axel Heim, Munich (DE); Joao Ferreira, Gilching (DE)

(73) Assignee: MICROCHIP TECHNOLOGY GERMANY GMBH, Rosenheim (DE)

(*) Notice: Subject to any disclaimer, the term of this patent is extended or adjusted under 35 U.S.C. 154(b) by 13 days.

This patent is subject to a terminal disclaimer.

(21) Appl. No.: 16/208,034

(22) Filed: Dec. 3, 2018

(65) Prior Publication Data

US 2019/0163323 A1 May 30, 2019

Related U.S. Application Data (63) Continuation of application No. 15/471,322, filed on Mar. 28, 2017, now Pat. No. 10,146,371.

(60) Provisional application No. 62/314,886, filed on Mar. 29, 2016.

(51) Int. Cl.
  *G06F 3/041* (2006.01)
  *G06F 3/044* (2006.01)

(52) U.S. Cl.
  CPC ............ *G06F 3/0418* (2013.01); *G06F 3/044* (2013.01); *G06F 3/0416* (2013.01); *G06F 2203/04108* (2013.01)

(58) Field of Classification Search
  CPC ...... G06F 3/0418; G06F 3/0416; G06F 3/044; G06F 2203/04108
  See application file for complete search history.

(56) References Cited

U.S. PATENT DOCUMENTS

| | | | |
|---|---|---|---|
| 10,146,371 B2 | 12/2018 | Heim et al. | |
| 2015/0138115 A1* | 5/2015 | Jang | G06F 3/0418 345/173 |

OTHER PUBLICATIONS

Yedamale, Padmaraja et al., "AN1375: See What You Can Do with the CTMU," Microchip Technology Incorporated, 12 pages, Feb. 18, 2011.

Davison, Burke, "AN1478: mTouchTM Sensing Solution Acquisition Methods Capacitive Voltage Divider," Microchip Technology Incorporated, 28 pages, Oct. 26, 2012.

Yang, Jun-Hyeok et al., "A Noise-Immune High-Speed Readout Circuit for In-Cell Touch Screen Panels," IEEE Transactions on Circuits and Systems—I: Regular Papers, vol. 60, No. 7, pp. 1800-1809, Jul. 1, 2013.

(Continued)

*Primary Examiner* — Lisa S Landis
(74) *Attorney, Agent, or Firm* — Slayden Grubert Beard PLLC (57) ABSTRACT

A method for touch detection includes identifying a high-pass filtered sequence from a plurality of sensor measurements, accumulating a number of samples from a first high-pass filtered sequence into an accumulated value, comparing the first accumulated value against a threshold of accumulated values, and, based upon a determination whether the accumulated value is greater than the threshold of accumulated values, identify whether the sensor has been approached.

27 Claims, 7 Drawing Sheets

(56) References Cited

OTHER PUBLICATIONS

Ragheb, A.N. et al., "Differentiator Based Sensing Circuit for Efficient Noise Suppression of Projected Mutual-Capacitance Touch Screens," IEEE International Conference on Electronics, Information, and Communications, 5 pages, Jan. 27, 2016.
International Search Report and Written Opinion, Application No. PCT/EP2017/057444, 13 pages, dated Jul. 11, 2017.

\* cited by examiner

WATER ROBUSTNESS AND DETECTION ON CAPACITIVE BUTTONS

PRIORITY

Cross-Reference to Related Applications

This application is a continuation of U.S. application Ser. No. 15/471,322 filed on Mar. 28, 2017, and U.S. Provisional Application No. 62/314,886 filed on Mar. 29, 2016, which are incorporated herein in their entirety.

This application claims priority to U.S. Provisional Application 62/314,886, filed Mar. 29, 2016, which is hereby incorporated by reference herein for all purposes.

TECHNICAL FIELD

The present disclosure relates to proximity and touch sensing, and, more particularly, to water robustness and detection on capacitive buttons.

BACKGROUND

Many different touch, proximity, and gesture detection devices are available for use in different applications. For example, various capacitive touch detection technologies are available from the assignee of the present application. These devices function on the principle of Capacitive Voltage Division (CVD) or charge time measurement technique. See, for example, Application note AN1478 entitled "mTouch™ Sensing Solution Acquisition Methods Capacitive Voltage Divider", issued by Microchip Technology Inc. Application note AN1375 discloses "See What You Can Do with the CTMU", issued by Microchip Technology Inc. Touch and proximity sensing buttons is normally accomplished by a very low end microcontroller with low processing power. Typically, the most simple and straightforward solution is the elected one.

SUMMARY

Embodiments of the present disclosure include at least one computer-readable medium containing instructions, the instructions, when loaded and executed by a processor, cause the processor to identify a first high-pass filtered sequence of a plurality of sensor measurements. In combination with any of the above embodiment, the instructions may further cause the processor to accumulate a plurality of samples from the first high-pass filtered sequence into a first accumulated value. In combination with any of the above embodiment, the instructions may further cause the processor to compare the first accumulated value against a first threshold of accumulated sensor measurements or values. In combination with any of the above embodiment, the instructions may further cause the processor to, based upon a determination whether the first accumulated value is greater than the first threshold of accumulated sensor measurements or values, identify whether the sensor has been approached. In combination with any of the above embodiment, the instructions may further cause the processor to cause a first low-pass filtering of the sensor measurements before or after the high-pass filtering. In combination with any of the above embodiment, the instructions may further cause the processor to comprising instructions for causing the processor to identify a second high-pass filtered sequence of the plurality of sensor measurements. In combination with any of the above embodiment, the instructions may further cause the processor to accumulate a plurality of samples from the second high-pass filtered sequence into a second accumulated value. In combination with any of the above embodiment, the instructions may further cause the processor to compare the second accumulated value against a second threshold of accumulated sensor measurements or values. In combination with any of the above embodiment, the instructions may further cause the processor to, based upon a determination whether the second accumulated value is greater than the second threshold of accumulated sensor measurements or values, identify whether the sensor has been approached. In combination with any of the above embodiment, the instructions may further cause the processor to compute the first high-pass filtered sequence by computing a differential between sensor measurements. In combination with any of the above embodiment, the instructions may further cause the processor to reset the first accumulated value when the first high-pass filtered sequence changes its sign. In combination with any of the above embodiment, the instructions may further cause the processor to reset the value as a result of low-pass filtering the high-pass filtered sequence changes its sign. In combination with any of the above embodiment, the instructions may further cause the processor to count a number of resets of the first accumulated value, wherein a given reset occurred after the first accumulated value exceeded an accumulation threshold during a defined time interval. In combination with any of the above embodiment, the instructions may further cause the processor to reset the first accumulated value when the high-pass filtered sequence reaches a reset threshold. In combination with any of the above embodiment, the instructions may further cause the processor to input the high-pass filtered sequence or sensor measurements preprocessed by the first low-pass filter into a Schmitt trigger with user-defined trigger hysteresis thresholds, wherein the first accumulated value is reset when the Schmitt trigger output is in one pre-defined level of a possible two output levels. In combination with any of the above embodiment, the instructions may further cause the processor to determine, through comparing the number of resets of the accumulated value within the defined time interval to a counting threshold, whether moving moisture is present on the sensor. In combination with any of the above embodiment, the instructions may further cause the processor to determine, through the sensor measurements, whether moving moisture is present on the sensor. In combination with any of the above embodiment, the instructions may further cause the processor to debounce the identification of whether the sensor has been approached based on whether moving moisture is present on the sensor. In combination with any of the above embodiment, the instructions may further cause the processor to debounce the identification of whether the sensor has been approached based on whether the first accumulated value has decreased. In combination with any of the above embodiment, the instructions may further cause the processor to extend a time for debouncing the identification of whether the sensor has been approached based on whether moving moisture is present on the sensor.

Embodiments of the present disclosure include an apparatus, including a processor to execute instructions of any of the embodiments of computer-readable media above.

Embodiments of the present disclosure include methods performed by any of the embodiments of apparatuses or processors above.

DETAILED DESCRIPTION

Figure 1:
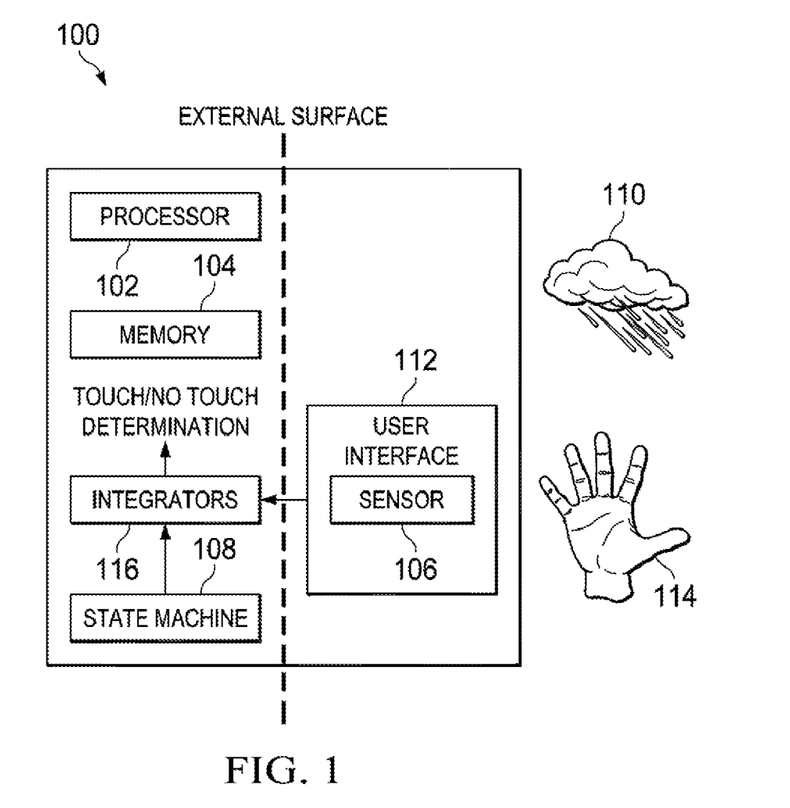
FIG. 1 is an illustration of an example system for touch and proximity sensing on capacitive sensors, in accordance with embodiments of the present disclosure.

FIG. 1 is an illustration of an example system 100 for touch and proximity sensing on capacitive sensors, in accordance with embodiments of the present disclosure. In one embodiment, system 100 may perform touch and proximity sensing while water or other moisture is present on sensors. In another embodiment, the water or other moisture may be accounted-for in the touch and proximity detection, but might not be explicitly identified as present. Such embodiments may thus accomplish touch and proximity detection that is robust with respect to water or other moisture that is present. In yet another embodiment, system 100 may incorporate explicit detection of water or other moisture into touch and proximity sensing. In a further embodiment, system 100 may identify moving water or moisture, such as rain, that might otherwise cause false-positive detection of touch or proximity. Although examples herein may use rain, detection of any moving water may be made. The water or other moisture may be present on sensors in system 100. System 100 may robustly handle the presence of water or other moisture on its sensors. The sensors may include capacitive sensors. Touch or approach detection on capacitive sensors may be highly sensitive to conductive materials, such as water or other moisture, that may surround the sensor. In outdoor applications, water may be a primary concern of robust sensing for system 100. Water on sensors and, in particular, moving water such as rain on sensors, may corrupt the sensor measurements and cause false touch or approach detections in system 100, if not for the configuration of system 100 to handle such water or other moisture.

System 100 may be implemented for any suitable touch or proximity sensing system. For example, system 100 may implement capacitive touch or proximity sensing systems out-of-doors where elements such as rain or condensation may cause moisture on the surface of sensors. Such systems may include, as mere examples, sensors underneath buttons or keypads on vending machines, automated teller machines, or security systems. Moreover, such systems may include touch screens, virtual keypads, or similar input on kiosks, tablets, computers, mobile devices, or other suitable electronic devices. In addition, such systems may include a handle to an automobile, levers, knobs, or any other mechanical or electro-mechanical object in which touch or proximity sensing is to be performed. The systems may also be implemented in white good devices, laundry machines, kitchen equipment, exhaust hoods, or coffee machines.

In one embodiment, system 100 may be implemented with sets of one or more integrators configured to accumulate or integrate the same sensing data. Integrators may integrate or accumulate data that has been subject to pre-processing, such as low-pass filtering with varying cut-off frequencies and differentiation over time. Each integrator in a set may vary according to an amount of low-pass filtering applied to the same set of original sensing data, as well as the time between the low-pass filtered data of which the difference is taken. The integrators in system 100 may accumulate low-pass filtered and differentiated measurements while, for example, the differentiated data increase, and the integrators reset when the differentiated data decrease. A set of integrators may accept inputs from one or more sensors. A set of integrators may integrate or accumulate pre-processed data from the same sensor or sensors, albeit with different amounts of low-pass filtering applied to the data set, or different time between the low-pass filtered data of which the difference is taken. The values compiled by the integrators may be used to detect touch or approach. The values may be evaluated by, for example, a state machine. This may differ from other solutions, wherein simple comparisons of the sensor measurements may be made against a threshold. In one embodiment, the integrators may be configured to accumulate values that are used to explicitly or implicitly determine whether water is present or moving on a surface of the sensors. Such a determination may be made by, for example, a state machine. In another embodiment, touch or approach detection analysis performed on values produced by the integrators may factor in whether water is present or moving.

In one embodiment, integrators may integrate or accumulate sensing data after low-pass filtering and differentiation has been applied to the sensing data. In another embodiment, a first integrator may integrate or accumulate sensing data with no low-pass filtering prior to differentiation, while a second integrator and additional integrators may integrate or accumulate the same sensing data but with low-pass filtering applied to the sensing data prior to differentiation. Different integrators may integrate sensing data for which different low-pass filtering has been applied, and with different time between the low-pass filtered data of which the difference is taken. For example, a first integrator may integrate or accumulate sensing data with a small amount of low-pass filtering applied, while a second integrator may integrate or accumulate the same sensing data with an increased amount of low-pass filtering applied. The stronger the low-pass filtering, the slower the approach and touch that can be detected by a given accumulator. The amount of low-pass filtering applied to a particular integrator can be set according to particular conditions that are to be detected or robustly managed, or according to characteristics of sensors. The low-pass filtering may include, for example, selecting only a subset of the available data for accumulation. For example, data without low-pass filtering may include as many data elements as are available from a given sensor, acquired at the sample rate. Accumulation of the difference of two such data elements may be made by computing the difference of data elements at consecutive moments in time defined by the original sample rate. Data with low-pass filtering may include data for which some samples are omitted. For example, only every other data element might be considered, effectively dividing the sample rate in half. In other examples, every nth low-pass filtered data element may be used. In yet other examples, accumulation of differences of data elements may be made with respect to a current data unit and a data unit L samples previous to the current data unit.

As mentioned above, detection of touch in capacitive sensors is trivially achieved in other solutions by comparing a measured signal from a sensor with a fixed threshold. However, the integrators of system 100 may account for a slow update of a zero level. A zero level may represent a measurement level of signals from the system 100 sensors when there is no approach or touch of a body. The zero level may be also referred to as a baseline level or an ambient level. In some situations, there may be a slow update of the zero level in system 100 to account for slow drifts in the measured value. Such drifts may be caused by change in temperature, electromagnetic signals or interference from the environment, or changes from the materials making up a surface of the sensors. Furthermore, when water falls on or condensation forms on sensors, the measured signal level of from sensors may change in a rapid manner. Thus, even systems that attempt to adjust a baseline measurement may falsely recognize such moisture conditions as a touch.

System 100 may be implemented in any suitable manner to recognize touch or proximity while factoring in whether moisture is present or moving on the touch or proximity surface. System 100 may include any suitable number and kind of touch or proximity sensors, such as sensor 106. Sensor 106 may be implemented by a suitable electronic device to changes in measurement values when an object 114 approaches or touches sensor 106. The measurement values can be any suitable data representation from the sensor, including voltage, current, or other physical phenomena. The measurements can also be of alternating nature, e.g. alternating between two signal levels. An approach or touch of sensor 106 with object 114 yields a change of at least one of the signal levels between the measurement signal is alternating. Object 114 may include, for example, a hand, finger, stylus, or portion thereof. Sensor 106 may produce measurement signals according to the proximity or touch of object 114. Sensor 106 may produce a baseline measurement that varies over time. Moreover, sensor 106 may produce a measurement that varies when moisture forms on a surface of sensor 106, or when moisture forms on a surface of system 100 and object 114 is in contact with such moisture and surface while also in contact or proximity with sensor 106. Such moisture may form from, for example, condensation, rain 110, or another source. Sensor 106 may be included in a user interface 112. User interface 112 may include, for example, a larger touch screen, button, lever, handle. The moisture that affects the measurement output of sensor 106 may be in contact with user interface 112.

Output signals from sensor 106 may be routed to analog circuitry, digital circuitry, or a combination thereof that form the integrators including the mechanisms for data pre-processing as discussed above. Analog-to-digital converters may be used to first transform the output signal into digital measurement values that may be analyzed and manipulated to take action according to the teachings of this disclosure. Thus, the integrators may be implemented in any suitable combination of analog or digital circuitry. For example, the integrators may be implemented, fully or in part, by suitable counter and logic circuits. In another example, the integrators may be implemented by circuitry implemented in a processor 102 coupled to a memory 104. In such an example, the integrators and other operation of system 100 may be implemented by instructions in memory 104 that, when are loaded and executed by processor 102, cause processor 102 to perform the functionality of system 100 as described in the present disclosure. Processor 102 may include, for example, an eight-bit microcontroller or processor thereof. Memory 104 may include volatile or non-volatile memory, such as RAM, ROM, or FLASH.

Sensor 106 may be polled or generate new signals representing discrete measurements at any suitable frequency. For example, sensor 106 may generate new signals at a rate on the order of hundreds of Hertz.

Integrators 116 implemented in system 100 may record values provided by sensor 106 over time. Particularly, integrators 116 may record differential values of the values provided by sensor 106, wherein the difference between a value at a first time and a value at a second time is recorded. The various levels of integrators 116 may detect moisture on the surface of system 100 through sensor 106 and may detect when a touch or proximity is sensed through the same sensor 106. Specific inferences from integrator operation may be controlled through a state machine 108. State machine 108 and integrators 116 may be implemented in any suitable combination of analog or digital circuitry, including by instructions in memory 104 for execution by processor 102.

System 100 may be configured to determine, through integrators 116 and state machine 108, not only touches but whether water is present or moving on sensor 106. Accordingly, use of system 100 in, for example, a car handle, can be used as a rain indicator for the car itself. Other rain indicators for automobiles might detect rain only after a certain time after starting the car, or at a minimum car velocity. Compared to optical or infrared sensors, when sensor 106 is implemented as a capacitive sensor, it typically has a lower power consumption, and particularly when it is running for keyless entry purposes—does detect rain continuously, especially when the car is parked. Hence, from the history of rain detection before starting the engine, it can be estimated if it is useful or necessary to, for example, wipe rain from the wind shield or rear window already before the car is moving. Also, when the car is being parked, the rain indication can be used to close the roof or windows when it is raining. Compared to optical or infrared sensors at the wind shield, having capacitive sensor at both front doors for touch or approach detection also ensures that rain is detected at least one of the door's handles whatever direction the rain is coming from in windy conditions. Sensor 106 can also serve with the primary purpose of rain detection or indication, e.g. for automatic shutting of roof windows when it starts raining. Such windows might also be present in homes or buildings.

Figure 2:
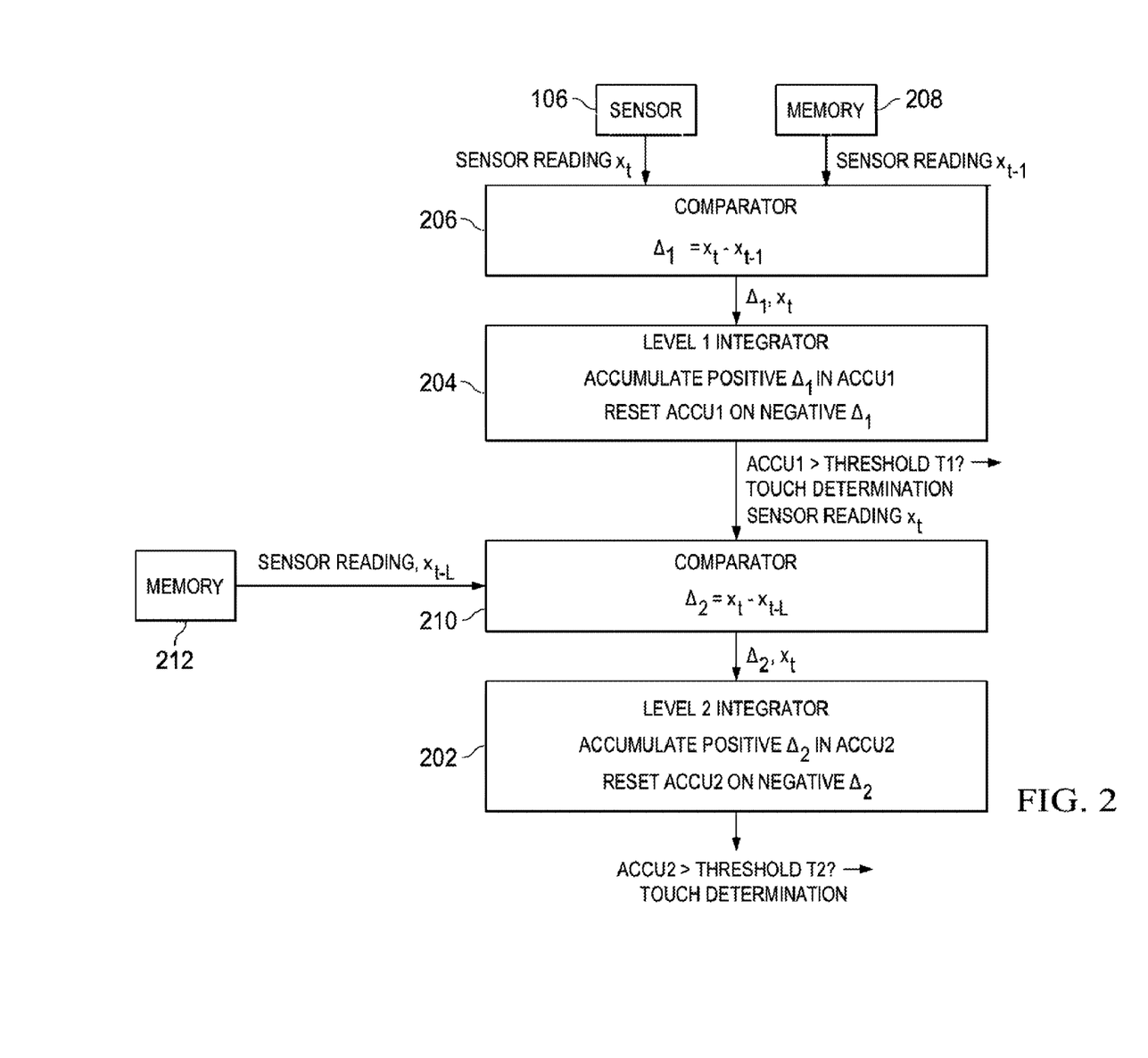
FIG. 2 illustrates two integrators, according to embodiments of the present disclosure.

FIG. 2 illustrates two integrators, according to embodiments of the present disclosure. While two integrators are shown, any suitable number and hierarchy of integrators may be used. A first integrator, level 1 integrator 204, may receive signals from sensor 106. More specifically, level 1 integrator 204 may receive an input from sensor 106 as modified by a comparator 206 that finds a differential input between different times of values from sensor 106. For example, at a time t, sensor 106 may output a measurement signal value. This value may be stored in memory 208. The value previously recorded at a time (t−1) may be retrieved and compared against the newly acquired value. Comparator 206 may issue a value reflecting the difference in the new value from sensor 106 and the immediately, previously stored value at time (t−1). The differential value may be accumulated in level 1 integrator 204. By accumulating the differential value, slow-changing conditions such as temperature and electromagnetic noise that affect the nominal output of sensor 106 may be accounted-for. Comparator 206 may be implemented by suitable analog or digital circuits, or by instructions executed by a processor.

In one embodiment, level 1 integrator 204 may be configured to accumulate a change ($\Delta_1 = x_t - x_{t-1}$) in sensor readings as detected from one time to the next (t versus t−1) if the differential reading $\Delta_1$ is positive or equal to zero. Moreover, level 1 integrator 204 may be configured to forward the sensor reading to another integrator such as level 2 integrator 202. At level 2 integrator 202, the value may be evaluated via another comparator 210, which may be implemented by suitable analog or digital circuits, or by instructions executed by a processor. Furthermore, the differential sensor reading may be stored to memory 212.

In another embodiment, level 1 integrator 204 may reset an accumulated value if the differential sensor input it receives is negative. In yet another embodiment, level 1 integrator 204 may reset an accumulated differential value if the differential input it receives is below a threshold.

Similarly, level 2 integrator 202 may accumulate differentials of its own inputs. Inputs to level 2 integrator 202 may be determined by comparator 210. In comparator 210, a differential input between different times of values from sensor 106 may be determined. The values selected by comparator 210 for comparison may be different than those selected by comparator 206. In one embodiment, at a time t, the measurement value previously recorded at a time (t−L) may be retrieved and compared against the newly acquired measurement value. Comparator 210 may issue a value reflecting the difference in the new value from sensor 106 and the previously stored value at time (t−L). The differential value may be accumulated at level 2 integrator 202. The value of L may be greater than one. The value may be selected according to design choice with respect to response of systems in various conditions. The greater the value of L, the longer the look-back that is used in evaluating whether an approach has occurred.

Thus, in one embodiment, level 2 integrator 202 may accept as input a differential between the measurements taken at different points in time, wherein a gap of at least one measurement occurs between the input points. In another embodiment, if the differential ascertained by comparator 210 is positive or equal to zero, this differential may be accumulated in level 2 integrator 202. However, if the differential ascertained by comparator 210 is negative, the value accumulated by level 2 integrator 202 may be set to zero.

By accumulating, level 2 integrator 202 and level 1 integrator 204 may add input differential values to a running total when such differentials are positive values. Furthermore, level 2 integrator 202 and level 1 integrator 204 may reset the running totals when input differential values are negative. The running total or accumulated values at each of the integrators 202, 204 may be used to determine whether a touch or approach has occurred. The running total or accumulated values at level 1 integrator 204 may be compared against a threshold defining an accumulated total of differential sensor readings since the last reset. Such a threshold may be referred to as threshold T1. The threshold may be set according to experimental results. Moreover, the running total or accumulated value at level 2 integrator 202 may be compared against a threshold defining an accumulated total of differential sensor readings since the last reset. Such a threshold may be referred to as threshold T2. In one embodiment, if either or both of integrators 202, 204 reach their respective thresholds, a touch or determination may be identified.

Thus, in one embodiment, each of the integrators may accumulate differential measurement inputs wherein the accumulated value increases as the measurement increases but it resets when the measurement value decreases.

In another embodiment, the integrators may accumulate differential measurements until the differential is less than a threshold, even if non-zero. In yet another embodiment, the integrators may accumulate differential measurement inputs wherein an approach or touch decreases a measurement signal. In such a case, the positive and negative aspects of signals, thresholds, and baselines may be reversed. Accumulators may reset when a differential is greater than zero.

Accordingly, a Schmitt trigger may be employed, wherein accumulators are reset when the differential input signal is of opposite sign to the sign of the accumulator output.

The values of the integrators 202, 204 may bring to light monotonic shifts in the signal. Such monotonic shifts in the signal may represent touches or proximity by object 114. The output of integrator 202 may be compared against a threshold. If the output of integrator 202 is above the threshold, then the sensor reading may be considered a touch. This output may be the change in sensor readings at a given time.

Figure 3:
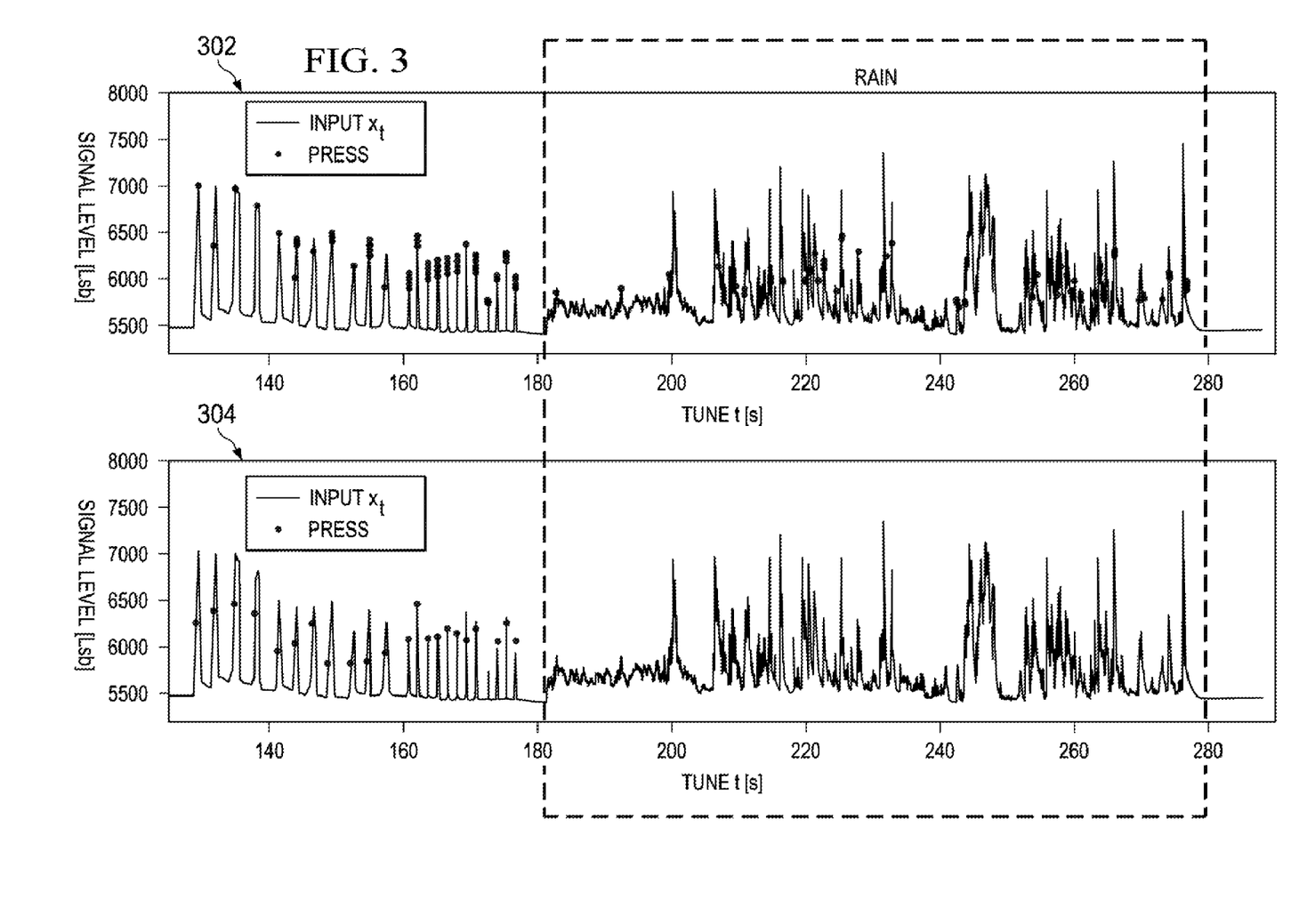
FIG. 3 is an illustration of sensor readings, according to embodiments of the present disclosure.

FIG. 3 is an illustration of sensor readings, according to embodiments of the present disclosure. Graph 302 may illustrate operation of a touch or proximity sensor that fails to implement teachings of the present disclosure. In one embodiment, graph 304 may illustrate operation of system 100. Graphs 302, 304 may illustrate measurement signals received from a touch or proximity sensor (such as sensor 106) versus time, illustrated in, for example, seconds, minutes, or hours. The underlying measurement signals in graphs 302, 304 may be the same. Dots on each graph may illustrate when a touch or approach has been identified, indicated as "PRESS". Thus, graphs 302, 304 reflect the difference in interpretation of the same sensor signals between other systems and embodiments of the present invention.

From the beginning until just after 182 seconds in each of graphs 302, 304, the surface of a touch or proximity sensor (such as sensor 106) may be dry. After 182 seconds in each of graphs 302, 304, the surface of the touch or proximity sensor may be rained upon or otherwise have moisture formed thereon.

Before 182 seconds, touches may be made on the sensor in both systems. These are shown by the dots in each of graphs 302, 304. Each peak of measurement in graphs 302, 304 may reflect the touch or close proximity of sensor 106 of an object. As shown in graph 304, system 100 may accurately detect a single touch or approach at each peak before 182 seconds. As shown in graph 302, other systems may detect touches or approaches at each peak before 182 seconds. However, there may be some bouncing, aliasing, double-touch, or other extraneous, false positive touch or approach detection, wherein multiple touches are identified from a single measurement peak. Other systems may rely on comparisons wherein the measurement signal itself is compared against a threshold.

However, after 182 seconds, no touches may be made of the sensor while rain falls on sensor 106 or moisture forms thereon. Accordingly, erratic measurement signals may result from sensor 106 which may be interpreted, incorrectly, by other systems as touches or approaches by an object. A moving baseline signal from sensor 106 may be insufficient to remove the false-positive detections of touches in other systems, as the rain or moisture may cause dramatic spikes as shown in graphs 302, 304. The spikes in measurement may be due to the change in capacitance or impedance caused by the moisture. The spikes in measurement due to the rain may be even higher than spikes in measurement caused by actual touches or approaches before the 182-second mark.

Nevertheless, system 100 might experience no such false-positives. System 100, through use of its integrators to process measurements from the sensor, may identify touches, may emphasize the monotonic shifts in the signal that are characteristic of touches. System 100, through use of its integrators to process differential measurements from the sensor, may filter out drifts and spikes caused by rain or water that are normally non-monotonic.

In one embodiment, system 100 may be configured to take into account whether rain or moisture is present or moving on or adjacent to sensor 106 when evaluating measurement signals from sensor 106. In another embodiment, system 100 may be configured to make determinations about whether rain or moisture is present or moving on or adjacent to sensor 106 through measurement signals of the same sensor 106. In yet another embodiment, system 100 may be configured to make determinations about whether rain or moisture is present or moving on or adjacent to sensor 106 as well as whether sensor 106 has been touched or approached through the measurement signals from sensor 106. In some embodiments, system 100 may be configured to make determinations about whether sensor 106 has been touched or approached without use of a running baseline or ambient measurement value from sensor 106. In other embodiments, system 100 may be configured to utilize a baseline that is adjusted upon a touch or approach detection in order to find a subsequent release.

Figure 4:
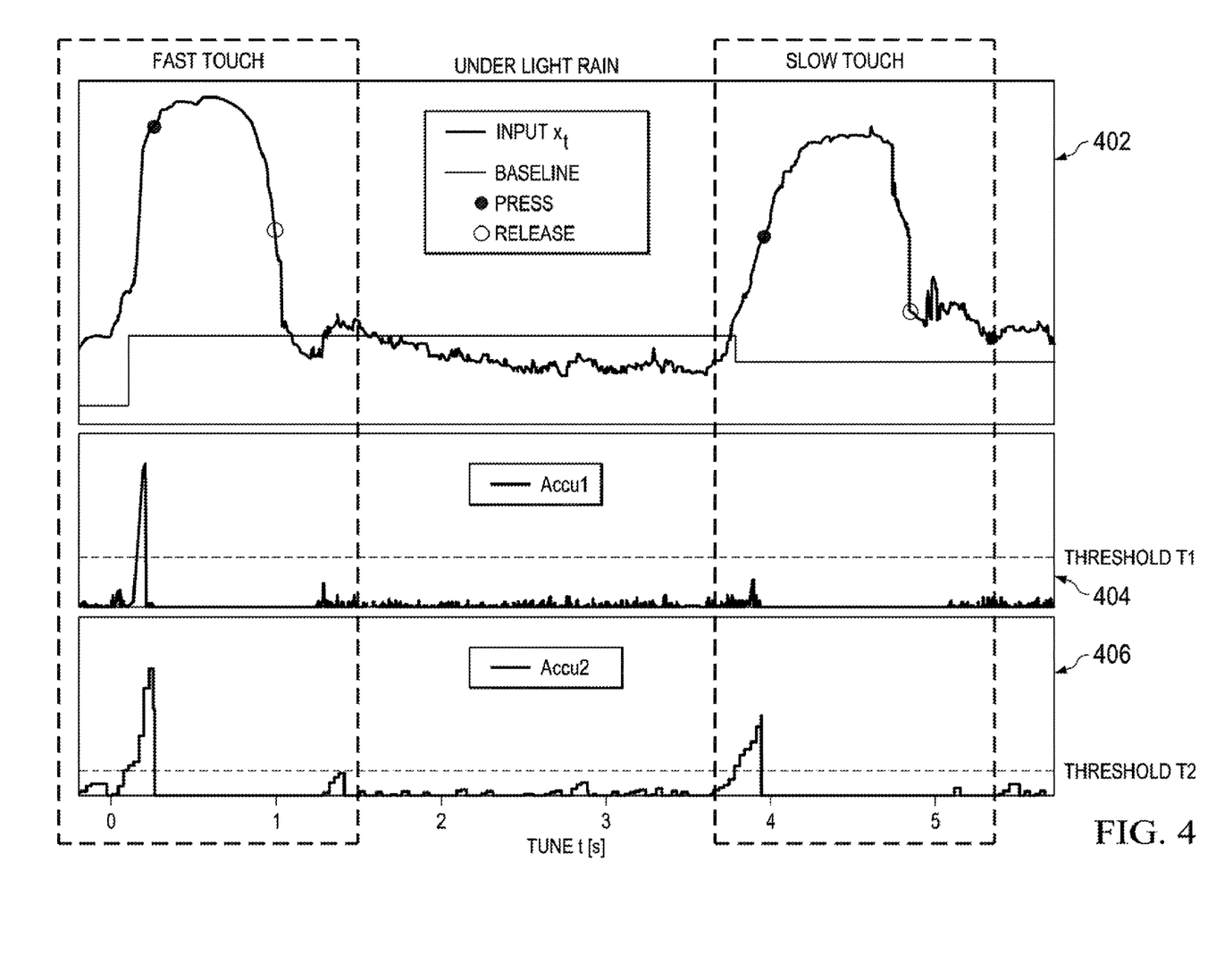
FIG. 4 illustrates operation of a system with respect to fast touches, slow touches, and rain or moisture formation, according to embodiments of the present disclosure.

FIG. 4 illustrates operation of system 100 with respect to a fast touch, a slow touch, and rain or moisture formation, according to embodiments of the present disclosure. Graph 402 may illustrate measurement signal output from sensor 106, as well as touches and releases identified by system 100. Graph 404 may illustrate output of level 1 integrator 204, wherein an approach is identified when the integrator output exceeds threshold T1. Graph 406 may illustrate output of level 2 integrator 202, wherein an approach is identified when the integrator output exceeds threshold T2. After an approach detection, the measurement signal must not drop below a certain level during a debounce period in order to detect a touch. The maximum amount by which the measurement signal may drop during the debounce period in order to detect a touch depends on the measurement signal level when having identified the approach. At the time of the approach identification, the baseline value may be updated to the measurement signal level minus the integrator output of the integrator whose output exceeds its threshold. This baseline may be used to evaluate during the debounce period.

From approximately 0 seconds until just past 1 second, an object may touch sensor 106 in a fast manner, meaning that the initial touch and then a subsequent release of the touch happen in a relatively decisive manner. The approach of an object to sensor 106 may be relatively quick, resulting in a sharp slope in an increase in measurement produced by sensor 106 as shown before the touch in the fast touch portion of FIG. 4. A fast release may similarly involve a relatively quick and decisive move away from sensor 106, resulting in a fast drop-off of the measurement signal.

From just before 4 seconds until just past 5 seconds, an object may touch sensor in a slow manner, meaning that the initial touch happens in a relatively less decisive manner. The approach of an object to sensor 106 may be relatively slow, resulting in a less dramatic slope in an increase in the measurement signal produced by sensor 106 as shown before the touch in the slow touch portion of FIG. 4. A slow release may similarly involve a relatively slow move away from sensor 106, resulting in a noisy signal after a release is determined but the object has not yet moved completely away and still contributes to measurement produced by sensor 106.

In between the fast touch and slow touch illustrated in FIG. 4, rain may fall on sensor 106. As shown, the rain may cause jumps or spikes in the measurement signal that would cause other systems to report touches.

Upon the fast touch, as shown in graph 404, level 1 integrator 204 may accumulate the quickly rising differential values of the measurement from sensor 106. This may cause level 1 integrator 204 to exceed its threshold T1. This may cause system 100 to identify that a primary indication of an approach or touch has occurred.

Moreover, also upon the fast touch, as shown in graph 404, level 2 integrator 202 may accumulate the quickly rising differential values of measurement from sensor 106. This may cause level 2 integrator 202 to exceed its threshold T2. This may also cause system 100 to identify that a primary indication of an approach or touch has occurred.

Notably, graph 404 illustrates that accumulation by level 2 integrator 202 is slower to rise than accumulation by level 1 integrator 204.

In one embodiment, after a touch is identified, accumulation by level 2 integrator 202 and level 1 integrator 204 may pause until after a release is identified.

During the period of rain, spikes in measurement signal level shown in graph 402 might have otherwise caused other systems to identify touches. However, given that such spikes are skinny, representing non-persistent changes in measurement level that quickly fall (and that integrators reset upon negative inputs), the measurement differentials do not accumulate in system 100 to a degree sufficient to trigger an identification of a touch or approach.

During the slow touch, there are insufficient consecutive increases in measurements to cause level 1 integrator 204 to accumulate differential values of the measurements from sensor 106 to a level that exceeds threshold T1. The slow touch or approach of an object to sensor 106 might not cause a dramatic rise in output of sensor 106. However, level 2 integrator 202 may sufficiently accumulate the differential values of the preprocessed (e.g., low-pass filtered) output from sensor 106. The differential input values were all positive, which did not cause a reset of the integrator. Accordingly, the slow touch is identified by level 2 integrator 202 exceeding its threshold T2. This may cause system 100 to identify that a touch or approach has occurred. While any given differential value during the slow touch might not be sufficient for level 1 integrator 204 to exceed its threshold T1, the non-monotonic nature of the rise of the signal from sensor 106 might not cause any negative inputs (that is, negative differentials) to level 2 integrator 202. Thus, level 2 integrator 202 might not reset and continue to accumulate its preprocessed input. Furthermore, level 2 integrator 202 might see the longer, gradual changes of the original input signal due to reliance upon low-pass-filtered data. Thus, level 2 integrator 204 may accumulate values to reach its threshold T2, identifying a touch or approach.

Although two integrators are shown in these example embodiments, more than two integrators may be used in a set of integrators. All the integrators may be accumulating differentials from the same original data from a sensor, albeit with different preprocessing, such as different levels of low-pass filtering. The different levels of low-pass filtering may account for multiple, different touch velocities. By employing multiple integrators with different preprocessing levels, it is possible to address both the detection of touches with low latency using integrator input with little or no preprocessing and to address slower touches and noisy environments with integrators using strong preprocessed inputs, yielding higher robustness and higher latency on touch detection.

The baseline shown in FIG. 4 may be used to identify release of touches. In one embodiment, such a baseline is not used as a comparison against output from sensor 106 to identify touches themselves. In another embodiment, such a baseline is not used as a comparison against differentials of output from sensor 106 to identify touches themselves. The baseline may be calculated upon a touch. The baseline may be calculated as the current measurement value from sensor 106 minus the respective integrator value. A release may be identified when the measurement signal drops below a defined percentage (such as fifty percent) difference between measured and baseline value.

After an approach, a touch is recognized if, during a timeout, the signal level does not decrease too much. In one embodiment, the value of the timeout and the amount by which it can decrease are dependent if there is water or not. If a touch is not recognized, it is aborted and algorithm continues waiting for new approaches, i.e. crossing of an accumulator value exceeding its respective threshold.

Water detection may be based on the number of otherwise false touches over a certain period. A false approach detection may occur when an integrator is reset while the integrator value is above a certain threshold. If the number of false approaches is high, water is said to be detected, if not, system 100 may assume that there is no water.

Figure 5:
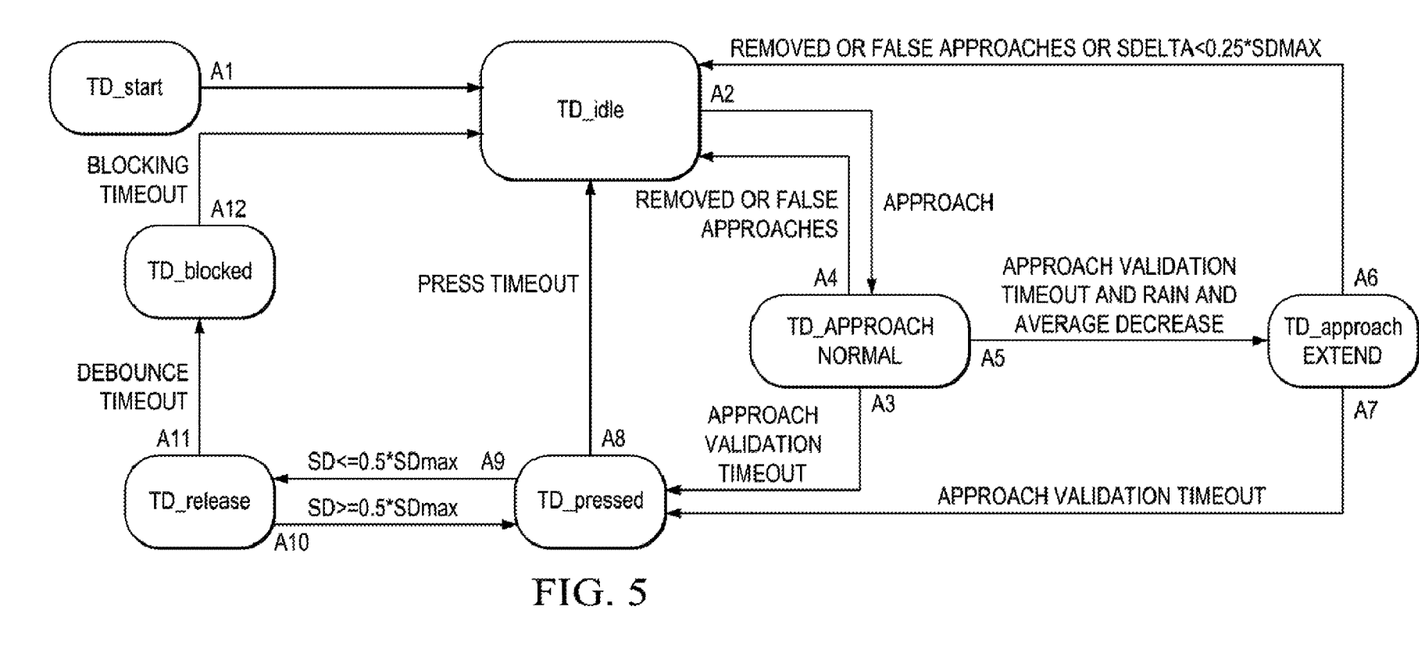
FIG. 5 is a more detailed illustration of operation of a state machine, according to embodiments of the present disclosure.

FIG. 5 is a more detailed illustration of operation of state machine 108, according to embodiments of the present disclosure. The values produced by integrators 202, 204 and interpretations of states of operation of integrators 202, 204 may be controlled in part by state machine 108. State machine 108 may perform debouncing as shown in FIG. 5.

In FIG. 5, "SD" and "SDelta" may represent a difference between the baseline and the current signal level. "SDmax" may represent a maximum value that the signal "SDelta" may achieve after detecting an approach or touch.

From a first state, TD start, state machine 108 may move via A1 into a TD_idle state. Upon a primary indication of an approach or touch, state machine 108 may move via A2 to TD_approach_normal. This primary indication could be the values accumulated by either integrator to exceed their respective thresholds. At this point, state machine 108 may move to other states via A3, A4, or A5, depending upon the conditions encountered. An approach validation timeout period may begin, wherein for that period, state machine 108 waits for contraindications that show that a touch should not be detected.

One such contraindication is that the measurement signal indicates a touch is immediately removed, before state machine 108 reaches the end of the approach validation period. The measurement signal may have dropped in value. A false approach may include such spikes as they are accumulated, but do not sustain a value long enough. In these cases, via A4 state machine 108 may return to TD_idle state.

Another such contraindication may include the presence of rain. Detection of rain may be illustrated by state machine operation in FIG. 6, described further below. It may also be determined whether an average decrease condition has been observed, wherein the level 1 integrator or the level 2 integrator has decreased its value. In one embodiment, if rain and the approach validation timeout occur, state machine 108 may move to TD_approach_extend state via A5. In another embodiment, if the average decrease condition, rain, and the approach validation timeout occur, state machine 108 may move to TD_approach_extend state via A5. This state may represent performance of system 100 wherein rain causes the timeout window in which a touch is to be detected to be extended. The timeout originally set for an approach validation timeout may be extended in this state.

At TD_approach_extend, state machine 108 may check for further contrapositives during the extended validation timeout. Such contrapositives may include removal or false approaches (as were checked in TD_approach_normal), as well as whether SD has fallen below 75% of SDmax. This last condition is another case similar to slow removal but may reflect a case where the approach was mistakenly detected and was caused, instead, by rain.

If the approach validation timeout expires (in TD_approach_normal), or if the extended validation timeout expires (in TD_approach_extend), then state machine 108 may move to TD_Pressed via A3 or A7, respectively. These represent operations wherein nothing has happened so as to cause system 100 to identify a contraindication to the initial touch.

At TD_pressed, it may be determined that a touch has actually occurred. Additional states may provide further debouncing. A press timeout may be initiated, and if other states are not first entered (leading eventually to a release), state machine may exit to TD_idle via A8.

Once the SD value drops to below fifty percent of SDmax, state machine 108 may enter TD_release via A9, indicating, initially, a release of the touch. A debounce timer may be initiated. At TD_release, if the SD value again rises above fifty percent of SDmax before expiration of the debounce timer, then state machine 108 may return to TD_pressed. Once expiration of the debounce timer occurs in TD_release, state machine 108 may exit to TD_blocked via A11.

At TD_blocked, state machine 108 may ignore other attempted touches for a time set by a blocking timeout. After expiration of the blocking timeout, state machine may return to TD_idle via A12.

Figure 6:
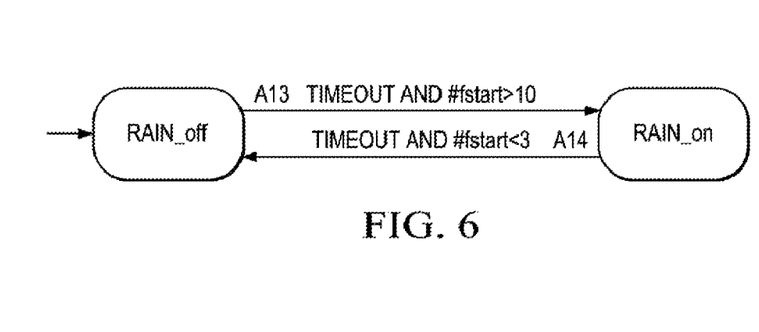
FIG. 6 is another, more detailed illustration of operation of a state machine, according to embodiments of the present disclosure.

FIG. 6 is another, more detailed illustration of operation of state machine 108, according to embodiments of the present disclosure. State machine 108 may check whether rain has been detected as shown in FIG. 6. Rain detection may be used to adjust touch or approach detection, such as in the states shown in FIG. 5. Rain detection may be used to otherwise compensate for false positive touches in any system in which output signal of sensor 106 is used to detect touches.

State machine 108 may begin in an initial state assuming that rain or moisture on the surface of sensor 106 is not present, such as RAIN_off. A rain timeout may be initiated, wherein if a shift between RAIN_off and RAIN_on is not detected, a new time period may begin and state machine 108 may remain in the same state.

Upon the completion of the rain timeout, if a number of false starts has not been reached, then state machine 108 may remain in the same state. The rain timeout may begin again. Upon the completion of the rain timeout, if a threshold number of false starts has been reached, then state machine 108 may transition to RAIN_on. The false starts may be attributable to otherwise false positive touches that would have been detected due to rain or moisture on the surface of sensor 106. The threshold number of false starts within a given amount of time may thus represent a condition that system 100 can ascertain as a rainy or moisture condition.

Once in the RAIN_on state, the rain timeout may begin again. Upon the completion of the rain timeout, if a low threshold of a number of false starts is still exceeded, then state machine 108 may remain in the same state since rain or moisture may still be present. The rain timeout may begin again. Upon the completion of the rain timeout, if the low threshold number of false starts such as two has not been exceeded, then state machine 108 may transition to RAIN_off. The thresholds for the number of false starts to transition may differ between RAIN_off and RAIN_on, as state machine 108 may be more forgiving to initially determine that rain or moisture is present than to, once rain or moisture is detected, determine that rain or moisture has safely passed.

False start counts may be tracked by measurements from sensor 106 which, if applied against a threshold in other systems, would be counted as a touch. For example, all touches detected during the rain conditions in graph 302 in FIG. 3 could be false touches and would count as false starts. Moreover, within the context of FIG. 5, false approaches or removals may count as false starts. A false approach may include when an integrator resets (upon, for example, a negative differential input) while the integrator value is above a certain threshold. If the number of false approaches is high, water is detected, if not, system assumes there is no water.

Accordingly, after an approach, a touch is recognized if, during a timeout, the signal level does not decrease too much. The value of the timeout and the amount by which the signal level can decrease are dependent if there is water or not. If touch is not recognized, it is aborted and the algorithm continues waiting for new approaches.

Figure 7:
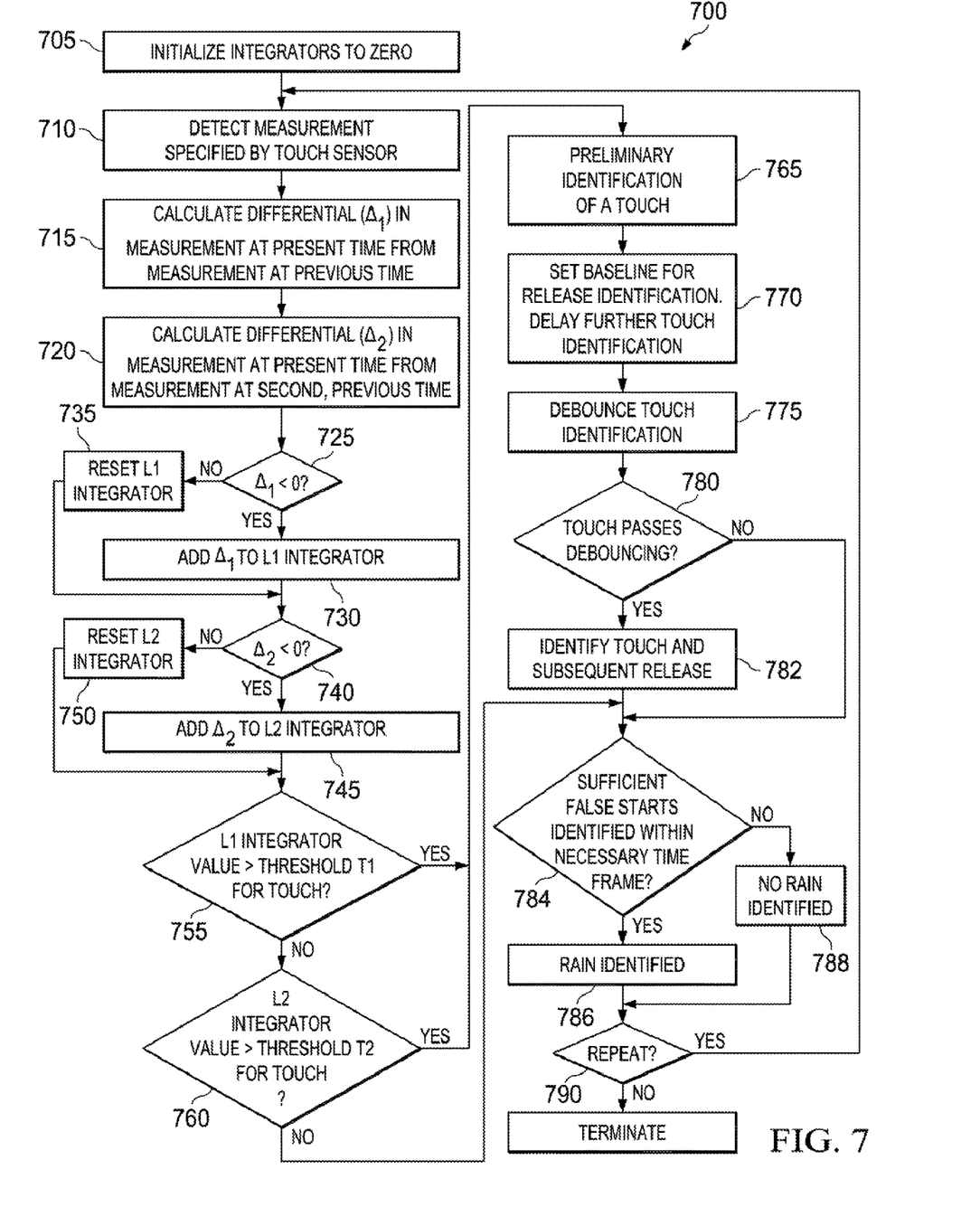
FIG. 7 illustrates an example method for detecting touch, according to embodiments of the present disclosure.

FIG. 7 illustrates an example method 700 for detecting touch, according to embodiments of the present disclosure.

At 705, integrators in the touch system may be initialized to zero. At 710, measurement signals provided by a touch sensor may be detected.

At 715, a differential (denoted as Δ1) may be calculated for measurements with little or no low-pass filtering performed as pre-processing. For example, a differential between the measurement from the touch sensor and such a measurement at a previous moment in time, such as the last sampled measurement or the last analyzed measurement, may be performed.

At 720, a differential value (denoted as Δ2) may be calculated for measurements with more low-pass filtering performed as preprocessing than was performed for the differential in 715. For example, a differential between the measurement from the touch sensor and a measurement at a further, previous moment in time may be calculated. The measurement at the further, previous moment in time may be from, for example, L samples previous.

At 725, it may be determined whether Δ1 is negative or whether Δ1 has flipped polarity with respect to accumulator output. If not, at 730, Δ1 may be added to the level 1 integrator. If so, at 735 the value of the level 1 integrator may be reset.

At 740, it may be determined whether Δ2 is negative or whether Δ2 has flipped polarity with respect to accumulator output. If not, at 745 Δ2 may be added to a level 2 integrator. If so, at 750 the level 2 integrator may be reset. The negative versus positive aspects of Δ1 and Δ2 may be reversed if increased measurement values are associated with a removal, rather than an approach, or an object to the sensors.

At 755, it may be determined whether the value of the first level integrator has exceeded a threshold T1 to indicate a touch. If so, method 700 may proceed to 765.

At 760, it may be determined whether the value of the second level integrator has exceeded a threshold T2 to indicate a touch. If so, method 700 may proceed to 765. Otherwise, method 700 may proceed to 784. The negative versus positive aspects of T1 and T2 thresholds may be reversed if increased measurement values are associated with a removal, rather than an approach, of an object to the sensors.

At 765, a preliminary indication of a touch or approach may be made. Method 700 may further process the signal information to determine whether false touches have been made, and to hold additional processing until the touch is processed.

At 770, a baseline for a subsequent release determination may be established. The baseline may include the current measurement value from sensor 106 minus the respective integrator value. Further touch identification may be paused until step 786. At 775, the touch may be debounced, in that subsequent measurements are evaluated to determine whether the touch data does not persist long enough to register as a touch, whether the touch fluctuates between touch and non-touch levels (in which case superfluous touches are ignored), or whether additional time should be allowed for processing if rain is present. Rain determination may be made in parallel by, for example, execution of 784-788. False approaches identified by 775 may contribute to rain determinations via a count of false approaches. Method 700 may wait to identify a subsequent release corresponding to the touch.

At 780, if the touch data passes the debouncing criteria, at 782 the touch and release may be confirmed. Otherwise the touch might not be confirmed as a touch.

At 784, it may be determined whether a sufficient number of false starts or approaches have been identified within a limited time so as to find in 786 that rain or moisture is identified or in 788 that such rain or moisture is not present. Different thresholds may be used to move between rain or no rain identification. 784-788 may execute in parallel with other portions of method 700.

At 790, method 700 may repeat at, for example, 710 or may optionally terminate.

Method 700 may be implemented by any suitable mechanism, such as by system 100 and the elements of one or more of FIGS. 1-6. Method 700 may optionally repeat or terminate at any suitable point. Moreover, although a certain number of steps are illustrated to implement method 700, the steps of method 700 may be optionally repeated, performed in parallel or recursively with one another, omitted, or otherwise modified as needed. Method 700 may initiate at any suitable point, such as at 705.

The method may be expressed formally as receiving a sequence x of values $x[k]$ at discrete times k, wherein the sequence is a series of measurements from the capacitive touch or proximity sensor. The method may then include computing multiple sequences $y^{(n)}[k]$ as functions $y^{(n)}[k] = f^{(n)}(x[k])$ of $x[k]$. For each sequence $y^{(n)}$, the method may include computing a high-pass filter sequence, given by $d^{(n)}[k]$. For each sequence $y^{(n)}$, the method may include accumulating the n-th high-pass (HP) filter's output values in accumulator $a^{(n)}[k]$, inputting the HP values into a Schmitt trigger, and resetting the accumulators $a^{(n)}[k]$ when the corresponding Schmitt trigger output changes. The HP values $d^{(n)}[k]$ may be delta values $a^{(n)}[k]=y^{(n)}[k]-y^{(n)}[k-L]$ or scaled delta values $d^{(n)}[k]=F*(y^{(n)}[k]-y^{(n)}[k-L])$, where F is a constant factor, and L is a delay value. The HP values $d^{(n)}[k]$ may be any high-pass filtered version of $y^{(n)}[k]$. The order of low-pass filtering and high-pass filtering x[k] may be swapped. The thresholds of the Schmitt trigger hysteresis may be user defined. The accumulators may be reset when the Schmitt trigger output is in one pre-defined level of its two possible output levels. Resetting the accumulator $a^{(n)}[k]$ may include setting its value to a pre-defined initial value, e.g. $a^{(n)}[k]=0$. If any of the accumulator values exceeds (or is equal to) a threshold, then an approach may be detected. A baseline $b[k]=x[k]-a^{(i)}[k]$ may be taken upon approach detection, wherein i is the index of any of the accumulators exceeding a respective threshold at time k. Rain may be detected if the number of detected false approaches exceeds a threshold T4 within duration D4. A false approach may occur upon an accumulator reset, wherein its value before the reset exceeds a threshold T5. A condition of "no rain" might be detected if the number of detected false approaches is below a threshold T6 within duration D6 (e.g. D6=D4). The method may utilize a state machine which changes into a debounce state when an approach is detected. Within the debounce state, a press may be detected if x[k]−b[k] exceeds an adaptive threshold T3[k] during a time-out period of given duration D3[k], where T3 and D3 depend on further variables. T3[k] and D3[k] may depend on variables indicating rain or (sprinkling) water or liquid detection.

Figure 8:
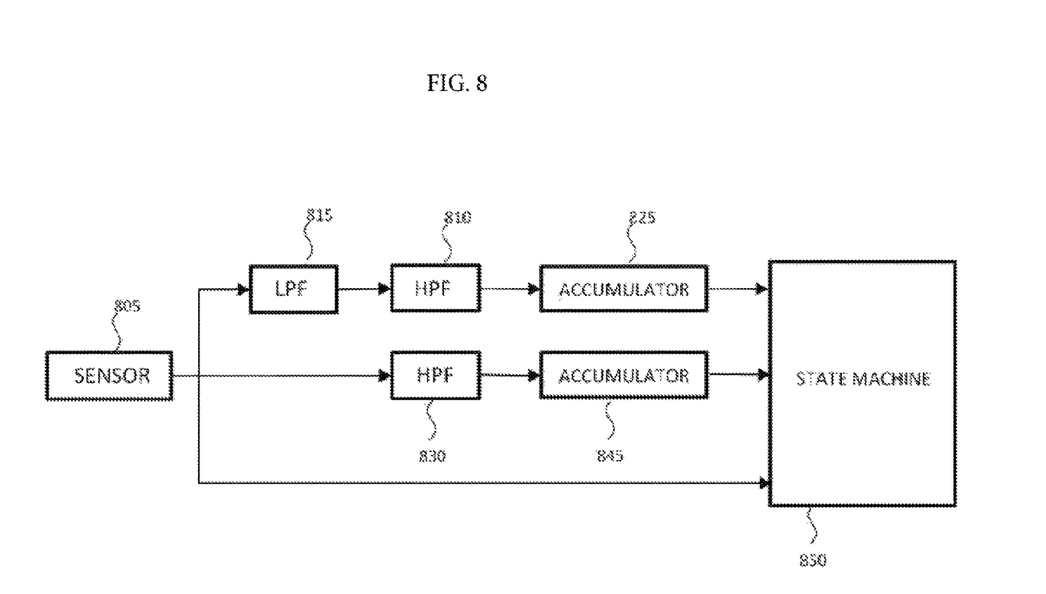
FIG. 8 illustrates a sensor, low-pass filter, high-pass filter, accumulators, and state machine, according to embodiments of the present disclosure.

FIG. 8 illustrates a sensor 805, low-pass filter (LPF) 815, high-pass filters (HPF) 810, 830, accumulators 825, 845, and a state machine 850, according to embodiments of the present disclosure. FIG. 8 may illustrate a more detailed view of system 100. Sensor 805 may be an implementation of sensor 106. State machine 850 may be an implementation of the state machines of FIGS. 5-6. LPF 815, HPF 810, 830, and accumulators 825, 845 may be implemented in analog circuitry, digital circuitry, instructions for execution by a processor, or any suitable combination thereof. State machine 850 may be implemented by instructions for execution by a processor.

Sensor measurements from sensor 805 may be passed through LPF 815 and HPF 810 Depending upon the resulting value, these values may be added into accumulator 825 or the accumulator may be reset.

In parallel, sensor measurements may be passed through HPF 830. Depending upon the resulting value, they may be added into accumulator 845 or the accumulator may be reset. In some embodiments, the sensor measurements may also be passed through another LPF with a different cut-off frequency than LPF 815 before being analyzed for addition to accumulator 845.

In state machine 850, the accumulated values from accumulators 825, 845 and the sensor measurements may be evaluated to detect a touch or an approach.

Although example embodiments have been described above, other variations and embodiments may be made from this disclosure without departing from the spirit and scope of these embodiments.

The invention claimed is:

1. At least one non-transitory computer-readable medium containing instructions, the instructions, when loaded and executed by a processor, cause the processor to:
   identify a first high-pass filtered sequence from a plurality of sensor measurements;
   accumulate a plurality of samples from the first high-pass filtered sequence into a first accumulated value;
   compare the first accumulated value against a first threshold of accumulated values; based upon a determination whether the first accumulated value is greater than the first threshold of accumulated values, identify whether the sensor has been approached; reset the first accumulated value when:
      the first high-pass filtered sequence changes its sign; or
      a result of low-pass filtering the high-pass filtered sequence changes its sign;
   count a number of resets of the first accumulated value, wherein a given reset occurred after the first accumulated value exceeded an accumulation threshold during a defined time interval; and
   determine, through comparing the number of resets of the accumulated value within the defined time interval to a counting threshold, whether the identification of whether the sensor has been approached is false.

2. The medium of claim 1, further comprising instructions for causing a first low-pass filtering of the sensor measurements before or after the high-pass filtering.

3. The medium of claim 1, further comprising instructions for causing the processor to:
   identify a second high-pass filtered sequence from the plurality of sensor measurements; accumulate a plurality of samples from the second high-pass filtered sequence into a second accumulated value;
   compare the second accumulated value against a second threshold of accumulated values; and
   based upon a determination whether the second accumulated value is greater than the second threshold of accumulated values, identify whether the sensor has been approached.

4. The medium of claim 1, where the first high-pass filtered sequence is computed by computing a sequence of differentials between sensor measurements.

5. The medium of claim 1, further comprising instructions for causing the processor to reset the first accumulated value when the high-pass filtered sequence reaches a reset threshold.

6. The medium of claim 1, further comprising instructions for causing the processor to input the high-pass filtered sequence into a Schmitt trigger with user-defined trigger hysteresis thresholds, wherein the first accumulated value is reset when the Schmitt trigger output is in one pre-defined level of a possible two output levels.

7. The medium of claim 1, further comprising instructions for causing the processor to debounce the identification of whether the sensor has been approached based on a determination that the identification that the sensor was approached is false.

8. The medium of claim 1, further comprising instructions for causing the processor to debounce the identification of whether the sensor has been approached based on whether the first accumulated value has decreased.

9. The medium of claim 1, further comprising instructions for causing the processor to extend a time for debouncing the identification of whether the sensor has been approached based on a determination that the identification that the sensor was approached is false.

10. An apparatus, comprising:
   a processor; and
   at least one non-transitory computer-readable medium containing instructions, the instructions, when loaded and executed by a processor, cause the processor to:
      identify a first high-pass filtered sequence from a plurality of sensor measurements;

accumulate a plurality of samples from the first high-pass filtered sequence into a first accumulated value;

compare the first accumulated value against a first threshold of accumulated values;

based upon a determination whether the first accumulated value is greater than the first threshold of accumulated values, identify whether the sensor has been approached;

reset the first accumulated value when:
  the first high-pass filtered sequence changes its sign; or
  a result of low-pass filtering the high-pass filtered sequence changes its sign;

count a number of resets of the first accumulated value, wherein a given reset occurred after the first accumulated value exceeded an accumulation threshold during a defined time interval; and determine, through comparing the number of resets of the accumulated value within the defined time interval to a counting threshold, whether the identification of whether the sensor has been approached is false.

11. The apparatus of claim 10, wherein the medium further comprises instructions for causing a first low-pass filtering of the sensor measurements before or after the high-pass filtering.

12. The apparatus of claim 10, wherein the medium further comprises instructions for causing the processor to:
identify a second high-pass filtered sequence from the plurality of sensor measurements; accumulate a plurality of samples from the second high-pass filtered sequence into a second accumulated value;
compare the second accumulated value against a second threshold of accumulated values; and
based upon a determination whether the second accumulated value is greater than the second threshold of accumulated values, identify whether the sensor has been approached.

13. The apparatus of claim 10, where the first high-pass filtered sequence is computed by computing a sequence of differentials between sensor measurements.

14. The apparatus of claim 10, wherein the medium further comprises instructions for causing the processor to reset the first accumulated value when the high-pass filtered sequence reaches a reset threshold.

15. The apparatus of claim 10, wherein the medium further comprises instructions for causing the processor to input the high-pass filtered sequence into a Schmitt trigger with user-defined trigger hysteresis thresholds, wherein the first accumulated value is reset when the Schmitt trigger output is in one pre-defined level of a possible two output levels.

16. The apparatus of claim 10, wherein the medium further comprises instructions for causing the processor to debounce the identification of whether the sensor has been approached based on a determination that the identification that the sensor was approached is false.

17. The apparatus of claim 10, wherein the medium further comprises instructions for causing the processor to debounce the identification of whether the sensor has been approached based on whether the first accumulated value has decreased.

18. The apparatus of claim 10, wherein the medium further comprises instructions for causing the processor to extend a time for debouncing the identification of whether the sensor has been approached based on a determination that the identification that the sensor was approached is false.

19. A method, comprising:
identifying a first high-pass filtered sequence from a plurality of sensor measurements;
accumulating a plurality of samples from the first high-pass filtered sequence into a first accumulated value;
comparing the first accumulated value against a first threshold of accumulated values;
based upon a determination whether the first accumulated value is greater than the first threshold of accumulated values, identifying whether the sensor has been approached;
resetting the first accumulated value when:
  the first high-pass filtered sequence changes its sign; or
  a result of low-pass filtering the high-pass filtered sequence changes its sign;
counting a number of resets of the first accumulated value, wherein a given reset occurred after the first accumulated value exceeded an accumulation threshold during a defined time interval; and
determining, through comparing the number of resets of the accumulated value within the defined time interval to a counting threshold, whether the identification of whether the sensor has been approached is false.

20. The method of claim 19, further comprising performing a first low-pass filtering of the sensor measurements before or after the high-pass filtering.

21. The method of claim 19, further comprising:
identifying a second high-pass filtered sequence from the plurality of sensor measurements;
accumulating a plurality of samples from the second high-pass filtered sequence into a second accumulated value;
comparing the second accumulated value against a second threshold of accumulated values; and
based upon a determination whether the second accumulated value is greater than the second threshold of accumulated values, identifying whether the sensor has been approached.

22. The method of claim 19, where the first high-pass filtered sequence is computed by computing a sequence of differentials between sensor measurements.

23. The method of claim 19, further comprising resetting the first accumulated value when the high-pass filtered sequence reaches a reset threshold.

24. The method of claim 19, further comprising inputting the high-pass filtered sequence into a Schmitt trigger with user-defined trigger hysteresis thresholds, wherein the first accumulated value is reset when the Schmitt trigger output is in one pre-defined level of a possible two output levels.

25. The method of claim 19, further comprising debouncing the identification of whether the sensor has been approached based on a determination that the identification that the sensor was approached is false.

26. The method of claim 19, debouncing the identification of whether the sensor has been approached based on whether the first accumulated value has decreased.

27. The method of claim 19, further comprising extending a time for debouncing the identification of whether the sensor has been approached based on a determination that the identification that the sensor was approached is false.

* * * * *